J. C. McKENZIE. 3 Sheets—Sheet 1.
Tile-Machine.
No. 9,162. Reissued April 20, 1880.
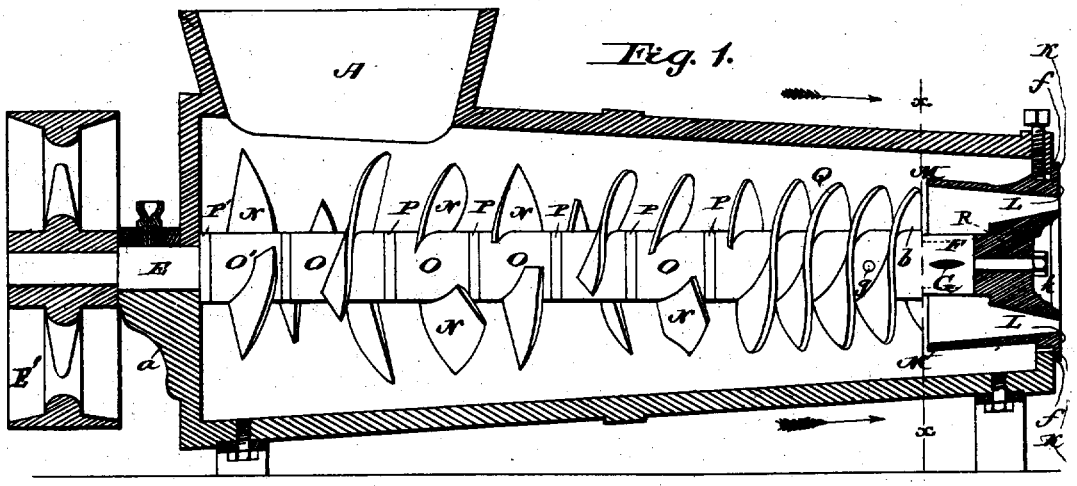
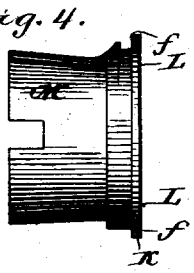
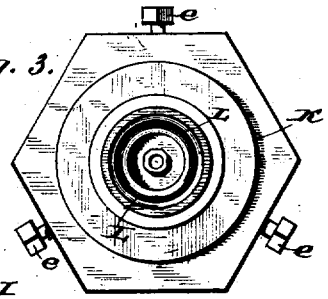
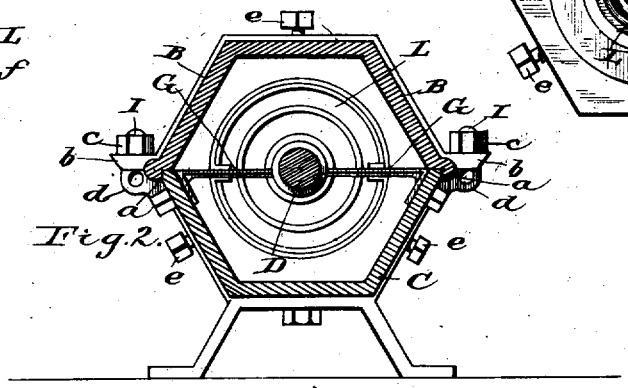
Attest.
A. M. Long.
Wm. Henderson
Jos. C. McKenzie.
Inventor.
By H. S. Abbot.
Atty.
N. PETERS, PHOTO-LITHOGRAPHER, WASHINGTON, D. C.

J. C. McKENZIE.

Tile-Machine.

No. 9,162. Reissued April 20, 1880.

Witnesses.
A. M. Long.
Wm. C. Kendrick

Jos. C. McKenzie.
Inventor.

By H. J. Abbot.
Atty.

N. PETERS, PHOTO-LITHOGRAPHER, WASHINGTON, D. C.

J. C. McKENZIE.

Tile-Machine.

No. 9,162. Reissued April 20, 1880.

Witnesses.

A. M. Long.

Jno. E. Hendrickson

Jos. C. McKenzie.
Inventor.

By H. C. Abbot.
Atty.

N. PETERS, PHOTO-LITHOGRAPHER, WASHINGTON, D. C.

UNITED STATES PATENT OFFICE.

JOSEPH C. McKENZIE, OF ADRIAN, MICHIGAN.

TILE-MACHINE.

SPECIFICATION forming part of Reissued Letters Patent No. 9,162, dated April 20, 1880.

Original No. 89,878, dated May 11, 1869. Application for reissue filed February 27, 1880.

*To all whom it may concern:*

Be it known that I, JOSEPH C. McKENZIE, of Adrian, in the county of Lenawee and State of Michigan, have invented a new and useful Improvement in Tile-Machines; and I do hereby declare the following to be a full, clear, and exact description of the same, sufficient to enable those skilled in the art to which it pertains to make, construct, and use the same.

My invention relates to that class of machines in which a slab or cylinder of clay is forced from the pug-mill or tempering-chamber, and is then cut into any desired lengths; and the object of my invention is to provide, first, a tempering-chamber in which the pressure is gradually increased as the clay is moved forward in the tempering-chamber from the point of its reception; second, to afford facilities for the ready removal of the clay from around and beneath the knives and shaft when the machine is not in motion; third, facilities for the quick and ready removal and replacement of the sleeves carrying knives from the front end of the shaft; fourth, to afford facilities for the proper adjustment of the mold in and removal from the face of the tempering-chamber; fifth, to reduce the tendency of the knives to clog with clay.

I attain these objects by mechanism illustrated in the accompanying drawings, in which—

Figure 5:
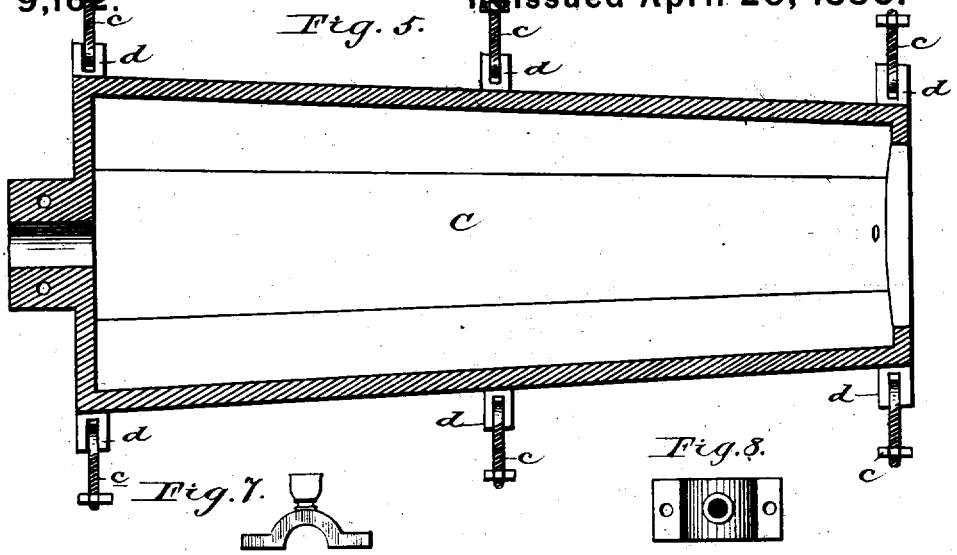
Figure 6:
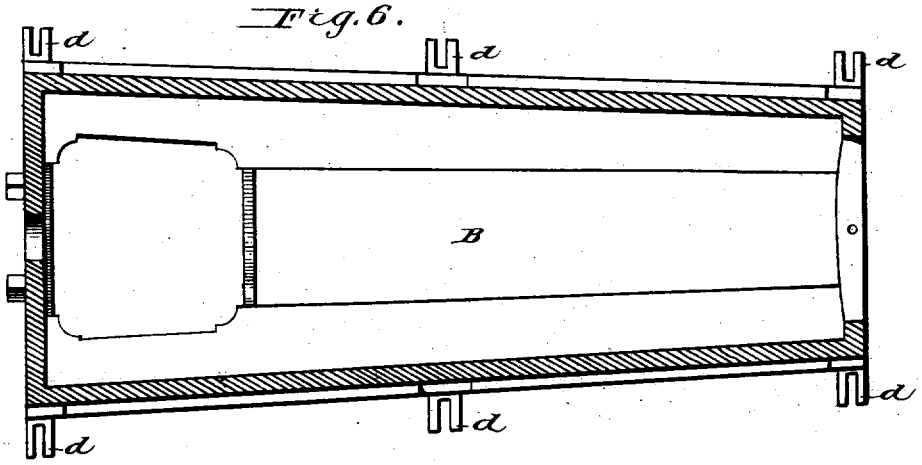
Figure 9:
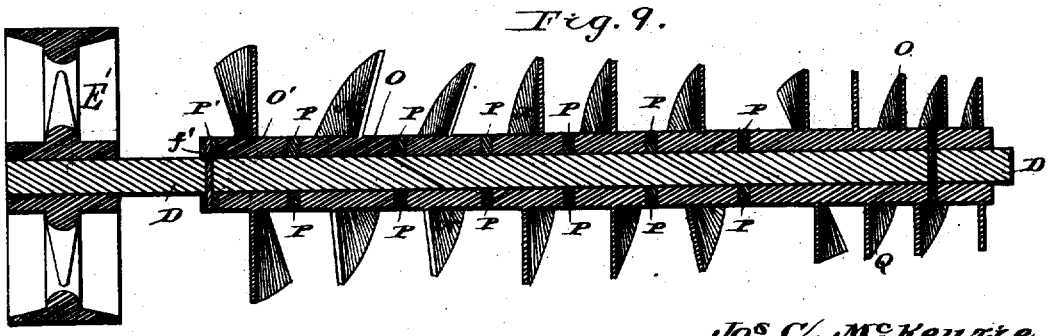
Figure 10:
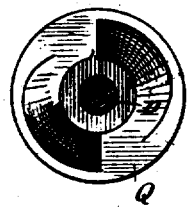
Figure 11:
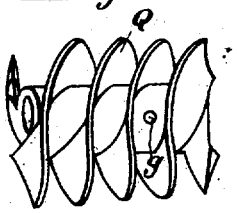
Figure 12:
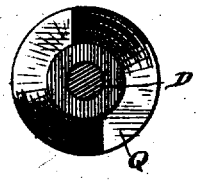
Figure 13:
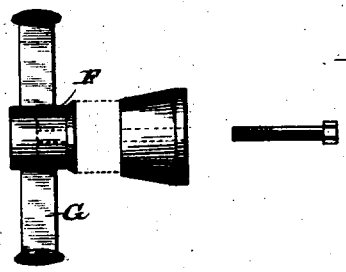
Figure 14:
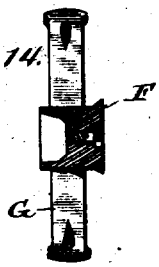
Figure 15:
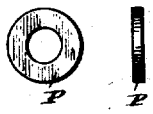
Figure 16:
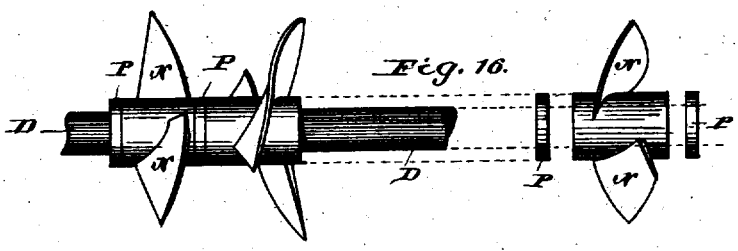

Figure 1 is a side elevation, partly in section. Fig. 2 is a section taken upon the line *x x* of Fig. 1, looking toward the front end. Fig. 3 is a view showing the front end of the machine. Fig. 4 is a side view of the mold removed from the machine. Fig. 5 is a plan view of the lower section of the trough with the top section and the tempering-shaft removed. Fig. 6 is a bottom view of the top section of the trough removed. Figs. 7 and 8 are views of the boxings supporting the shaft at the rear end. Fig. 9 is a longitudinal vertical section of the tempering-shaft, screw, sleeves, and collars. Fig. 10 is an end view of the screw, showing the end next to the cutting-blades. Fig. 11 is a side view of the screw. Fig. 12 is an end view of the screw at expelling-point. Fig. 13 is a bottom view of the bar and core. Fig. 14 is a section of the bar and bearing for shaft. Fig. 15 shows the collars; and Fig. 16 is a side view of shaft, collar, and sleeve, showing a collar and sleeve ready to be pushed onto the shaft.

A represents a horizontal tempering-chamber or trough, preferably of hexagonal or octagonal form, constructed of any well-known suitable material, and tapering gradually on all its sides from the feeding to the discharging end. The tempering-chamber A is constructed in two parts, B and C. C, being the lower part or trough, is attached to any suitable frame or means of support, and sustains the shaft D by a bearing, E, in its rear end, and a bearing, F, supported by bars G, resting on its sides near the front end. B is the top part or cover, at the rear end of which is placed the hopper H, into which the clay to be used is dumped. This cover B fits down upon the trough C, and has a flange, *a*, extending over the sides of the trough, and furcated lugs *b* for receiving the swinging bolts I, which are provided with nuts *c* and are hinged in lugs *d* of the trough C.

When the cover is placed on the trough the bolts I are swung up into the furcated lugs and the nuts *c* tightened.

When the cover is to be removed the nuts are loosened, the bolts thrown down, and the cover lifted off.

The front end of the tempering-chamber is provided with a face-plate, K, which I have shown as a flange extending inwardly from the trough C and cover B to a suitable distance, leaving an opening in the face for the reception of a removable and adjustable mold, L. This mold is made adjustable by means of set-screws *e e e*, passing through the cover and trough and resting in sockets prepared for them in the outer surface of the mold, as shown in Fig. 1 of drawings. The mold L has considerable play in every direction in the opening of the face-plate, and has a flange, *f*, that extends over the face-plate a sufficient distance on every side to cover the opening at every adjustment. The mold L has also a cylindrical diverging extension, M, which extends into the tempering-chamber to a point near the end of the screw, and receives the tempered clay from the end of the screw. This cylindrical extension is slotted on both sides to accommodate the bars G.

The shaft D runs horizontally through the center of the trough, and is supplied with knives N, of a peculiar shape, arranged and securely fastened upon the shaft D, so as to form, when completed, a double screw-thread, divided, however, along the line of the shaft into several sections. These knives N are in shape very much like the lower half-turn of the bit of an auger, with the working-face concave, the outer edge sharpened, and the inner edge fastened to or formed as a part of a sleeve, O, which is fastened to the shaft, as shown in the drawings. Each sleeve bears two knives, one opposite to the other. Between the sleeves are placed collars P, covering the shaft between the sleeves and bracing the sleeves against each other.

The rearmost one of the collars, P′, which is placed back of the sleeve O′, is secured by a pin, *f′*, passing through both sides of the collar and the shaft, forming a shoulder to resist the endwise pressure of the shaft when at work.

The trough C is re-enforced beneath the bearing E, to form a sufficient seat for the bearing E of the shaft D, which extends to the rear of the bearing, and there receives a pulley, E′, through which power is applied to the machine.

Each succeeding set of knives approaching the mold L from the bearing E is shorter in length than its predecessor, so that the outer line described by the knives converges toward the mold and is parallel to the sides of the trough. The shape of these knives adapts them to the trough in which they move, and their being divided and arranged as described, also, in conjunction with the peculiar shape of the trough, tends to prevent the knives or trough from clogging with the clay, as so often happens in the ordinary tile-machine in use.

At the discharging end of the trough the shaft is provided with a screw, Q, attached to the shaft by means of a pin, *g*, passing through the shaft and both sides of the screw, which forces the clay into and through the mold L surrounding the core.

The shaft projects beyond the screw, so as to enter the seat *k*, forming the bearing F. To the opposite side a removable core, R, is attached by means of a square-headed screw, *k*, which passes through the center of the core and into the seat, and permits the core to be taken out and exchanged for one of different size and shape, when desired.

The sides of the core R are round and inclined, diverging to the front end, which extends to the line of the front of the mold L.

It is obvious from the construction of the parts that the mold L, as well as the core R, may be taken out and exchanged for one of different size and shape when desired.

I am aware that cutting-knives and screw-threads fastened permanently to a revolving shaft have before been used, as also have stationary cores.

What I claim as new is—

1. The adjustable mold L, surrounding the core R, in combination with the screws *e e e* and face-plate K, operating substantially as and for the purpose set forth.

2. In combination with the angular trough C, the swing-bolts I, operating as and for the purpose set forth.

3. The combination of the tapering angular trough C, the shaft E, when supplied with the knives N and screw Q, and the screws *e e e*, and mold L, and core R, substantially as and operating in the manner set forth.

4. In a brick-machine, a spiral cutting-blade, N, constructed and arranged substantially as shown and described.

5. In a brick-machine, a continuously-tapering horizontal tempering-chamber, opening at its center in two equal sections extending the entire length, for convenience in removing the clay from the tempering-chamber and cutting-knives, as well as the screw from the shaft, substantially as shown and described.

6. A series of spiral cutting-knives of diminishing length of blade formed in the line of a continuous converging screw, substantially as shown and described.

7. In a brick-machine, a tempering chamber or trough provided with a face-plate, K, in combination with a mold, L, substantially as shown and described.

JOSEPH C. McKENZIE.

In presence of—
R. B. ROBBINS,
J. I. KNAPP.